United States Patent
Quake et al.

(10) Patent No.: US 7,248,413 B2
(45) Date of Patent: Jul. 24, 2007

(54) MICROLENSING PARTICLES AND APPLICATIONS

(75) Inventors: Stephen R. Quake, San Marino, CA (US); James P. Brody, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 11/095,332

(22) Filed: Mar. 30, 2005

(65) Prior Publication Data

US 2005/0168828 A1  Aug. 4, 2005

Related U.S. Application Data

(62) Division of application No. 10/603,502, filed on Jun. 24, 2003, now Pat. No. 6,958,865, which is a division of application No. 09/441,152, filed on Nov. 12, 1999, now Pat. No. 6,614,598.

(60) Provisional application No. 60/108,385, filed on Nov. 12, 1998.

(51) Int. Cl.
*G02B 11/00* (2006.01)
*G02B 3/00* (2006.01)
*G02B 27/02* (2006.01)
*H01J 3/14* (2006.01)

(52) U.S. Cl. .................. 359/642; 359/626; 359/641; 359/664; 359/799; 359/800; 250/216; 250/227.2; 250/228; 385/35

(58) Field of Classification Search ........... 359/664, 359/798–800, 642, 626, 641; 250/216–227.13, 250/227.2, 228; 385/35
See application file for complete search history.

(56) References Cited

U.S. PATENT DOCUMENTS

| | | | |
|---|---|---|---|
| 4,155,962 A | 5/1979 | Mohn et al. | |
| 4,540,534 A | 9/1985 | Grendol | |
| 4,798,428 A | 1/1989 | Karim et al. | |
| 5,121,256 A | 6/1992 | Corle et al. | |
| 5,171,995 A | 12/1992 | Gast et al. | |
| 5,317,452 A | 5/1994 | Prentiss et al. | |
| 5,583,351 A | 12/1996 | Brown et al. | |
| 5,729,393 A | 3/1998 | Lee et al. | |
| 5,764,613 A | 6/1998 | Yamamoto et al. | |
| 5,776,191 A | 7/1998 | Mazzocco | |
| 5,815,306 A | 9/1998 | Sheridon et al. | |
| 5,939,709 A | 8/1999 | Ghislain et al. | |
| 6,181,478 B1 | 1/2001 | Mandella | |
| 6,200,737 B1 | 3/2001 | Walt et al. | |

(Continued)

FOREIGN PATENT DOCUMENTS

EP  0 362 993 A2  4/1990

(Continued)

OTHER PUBLICATIONS

Berg, Howard C. "Dynamic properties of bacterial flagellar motors", Nature, vol. 248, May 3, 1974.

(Continued)

*Primary Examiner*—Evelyn A. Lester
(74) *Attorney, Agent, or Firm*—Townsend and Townsend and Crew LLP

(57) ABSTRACT

A microscopic lens, of size approximately 1 micron is used for its optical characteristics.

6 Claims, 4 Drawing Sheets

U.S. PATENT DOCUMENTS

| | | |
|---|---|---|
| 6,236,513 B1 | 5/2001 | Mallary |
| 6,270,696 B1 | 8/2001 | Jain et al. |
| 6,277,545 B1 | 8/2001 | Iida et al. |
| 6,298,026 B1 | 10/2001 | Suzuki et al. |
| 6,301,055 B1 | 10/2001 | Legrand et al. |
| 6,307,689 B1 | 10/2001 | Ichimura et al. |
| 6,369,957 B1 | 4/2002 | Ishida |
| 6,503,831 B2 | 1/2003 | Speakman |
| 6,548,171 B1 | 4/2003 | Barbera-Guillem et al. |
| 6,560,030 B2 | 5/2003 | Legrand et al. |
| 6,608,726 B2 | 8/2003 | Legrand et al. |
| 6,614,598 B1 | 9/2003 | Quake et al. |
| 6,781,690 B2 | 8/2004 | Armstrong et al. |
| 6,836,384 B2 | 12/2004 | Legrand et al. |
| 2003/0032204 A1 | 2/2003 | Walt et al. |
| 2003/0076649 A1 | 4/2003 | Speakman |
| 2005/0036222 A1 | 2/2005 | Quake et al. |
| 2005/0052754 A1 | 3/2005 | Quake et al. |

FOREIGN PATENT DOCUMENTS

| | | |
|---|---|---|
| JP | 8-001810 A | 1/1996 |
| JP | 11 197587 A | 7/1999 |
| JP | 2000-89004 A | 3/2000 |
| WO | WO 98/19654 A1 | 5/1998 |

OTHER PUBLICATIONS

Berry, Richard M. et al. "Absence of a barrier to backwards rotation of the bacterial flagellar motor demonstrated with optical tweezers", Proc. Natl. Acad. Sci, USA. vol. 94, pp. 14433-14437, (Dec. 1997).

Brody et al. "A Selt-Assembled Microlensing Rotational Probe" Applied Physics Letters, 1999, pp. 144-146, vol. 74, No. 1.

Elson, Elliot L. "Fluorescence Correlation Spectroscopy and Photobleaching Recovery", Ann. Rev. Phys. Chem. (1985);36:379-406.

Finer, Jeffrey T. et al. "Single myosin molecule mechanics: piconewton forces and nanometre steps." Nature, vol. 368, Mar. 10, 1994, pp. 113-119.

Jameson, D.M. and Hazlett, T.L. "Time-Resolved Fluorescence in Biology and Biochemistry", Biophysical and Biochemical Aspects of Fluorescence Spectroscopy; T.G. Dewey Ed., (1991), pp. 105-133, Plenum Publishing Corp.

Kinosita, Kazuhiko Jr. et al. "$F_{.sub.1}$-ATPase: A rotary motor made of a single molecule", Cell, vol. 93, pp. 21-24, Apr. 3, 1998.

Mervis, J. et al. "Aligning and attaching a lens to an optical fiber using light pressure force", Optics Letters, vol. 18, No. 5, Mar. 1, 1993, p. 325.

Miguez, H. et al. "Photonic crystal properties of packed submicrometric $SiO.sub.2$ spheres", American Institute of Physics (1997), 3 pages.

Perkins, Thomas T. "Relaxation of a single DNA molecule observed by optical microscopy" Science, vol. 264, May 6, 1994.

Shingyojl, Chikako et al. "Dynein arms oscillating force generators", Nature, vol. 393, Jun. 18, 1998.

Silverman, Michal et al. "Flagellar rotation and the mechanism of bacterial motility", Nature vol. 249, (May 3, 1974).

Smith, Stephen P. et al. "Inexpensive optical tweezers for undergraduate laboratories", Am. J. Phys. 67(1), Jan. 1999, pp. 26-35.

Svoboda, Karel et al, "Direct observation of kinesin stepping by optical trapping interferometry", Nature, vol. 365, Oct. 21, 1993.

Ashkin, A. et al., "Optical Trapping And Manipulation Of Single Cells Using Infrared Laser Beams," Nature, vol. 330, No. 24, pp. 769-771, Dec. 31, 1987.

Ashkin, A. et al., "Optical Trapping And Manipulation Of Viruses And Bacteria," vol. 235, pp. 1517-1520, Mar. 20, 1987.

Buican, Tudor N. et al., "Automated Single-Cell Manipulation And Sorting By Light Trapping," Applied Optics, vol. 26, No. 24, pp. 5311-5316, Dec. 15, 1987.

Hornbeck, Larry J. et al., "Bistable Deformable Mirror Device," Spatial Light Modulators and Applications 1988 Technical Digest Series, Summaries of papers presented at the spatial Light Modulators and Applications Topical Meeting, Optical Society of America, vol. 8, Postconference Edition, A215, pp. 107-110, Jun. 15-17, 1988.

Lessard, Guillaume A. et al., "A Scanning Apertureless Fluorescence Microscope," 8 pages, no date available.

Lin, L. Y. et al., "Free-Space Micromachined Optical Switches For Optical Networking," IEEE Journal of Selected Topics in Quantum Electronics, vol. 5, No. 1, pp. 4-9, Jan. 1999.

Meiners, Jens-Christian et al., "Direct Measurement Of Hydrodynamic Cross Correlations Between Two Particles In An External Potential," Physical Review Letters, vol. 82, No. 10, pp. 2211-2214, Mar. 8, 1999.

Muller, Richard S. et al., "Surface-Micromachined Microoptical Elements And Systems," Proceedings of the IEEE, vol. 86, No. 8, pp. 1705-1720, Aug. 1998.

DIM SIGNAL

ENHANCED SIGNAL

US 7,248,413 B2

MICROLENSING PARTICLES AND APPLICATIONS

RELATED APPLICATIONS

This application is a divisional of U.S. patent application Ser. No. 10/603,502, filed Jun. 24, 2003, now U.S. Pat. No. 6,958,865, which is a divisional of U.S. patent application Ser. No. 09/441,152, filed Nov. 12, 1999, now U.S. Pat. No. 6,614,598, which claims the benefit of the filing date of U.S. Provisional Application No. 60/108,385, filed on Nov. 12, 1998, the entire disclosure of each of which is incorporated herein by reference for all purposes.

GOVERNMENT CONTRACTS

The work described in this application was supported by Grant No. PHY97-22417 awarded by the National Science Foundation.

BACKGROUND

Spherical polymer microspheres can be mass produced with extraordinary precision and low cost. Many uses for these microspheres have been developed that rely on the specific binding of a microsphere to a target, and the labelling of the polymer microsphere with various dyes or magnetic material.

Spherical glass lenses greater than 1 mm in diameter are used for coupling light into or out of fibers as well as for relaying images across a short distance.

The present application describes new optical applications of spherical polymer microspheres less than 10 microns in diameter.

SUMMARY

The present application teaches a special microlensing particle and applications of the particle. According to the present invention, a latex microsphere of diameter 0.3 μm-4 μm is obtained. Latex microspheres of this type are commercially available and have been used in pregnancy tests and other applications that do not exploit their optical properties.

According to the present system, the latex microsphere is preferably less than 10 μm in diameter, more preferably 1 to 2 μm in diameter. The latex microsphere is used in combination with an optical imaging element.

Applications of the latex microsphere include a micro lensing rotational probe for use in detecting high frequency rotational motion, a scanning microscope, and a diode laser collimator device.

BRIEF DESCRIPTION OF THE DRAWINGS

These and other aspects will now be described in detail with respect to the accompanying drawings, wherein.

DETAILED DESCRIPTION

Figure 1:
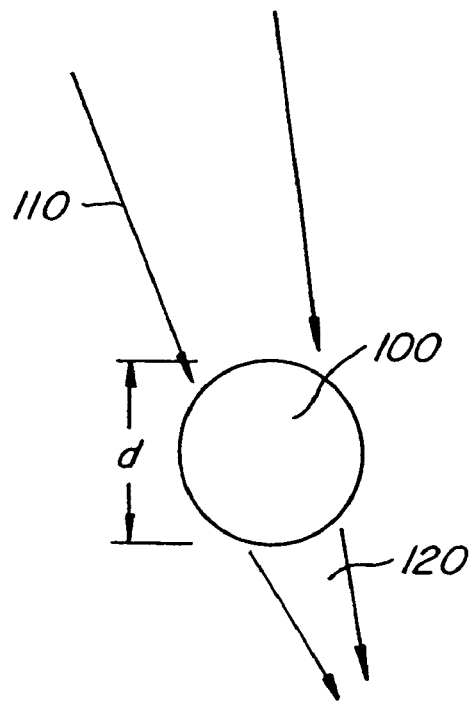
FIG. 1 shows a diagram of the optical microsphere.

FIG. 1 shows the use of a miniature optical element, e.g., a spheroid element, e.g. a microsphere, to change the characteristics of incoming light. The optical microsphere 100 is a latex sphere or spheroid body, which has at least one round cross section, and in which the diameter D of the round cross section is between 0.8 and 2 μm. More generally, the Latex particles of this type are commercially available from Bangs, or Interfacial Dynamics Corporation, or other companies.

It was found by the present inventors that the latex sphere has a collimating effect on incoming light. Incoming light 110 is collimated by the sphere into collimated light 120. The collimated light can be used for various purposes described herein.

Figure 2A:
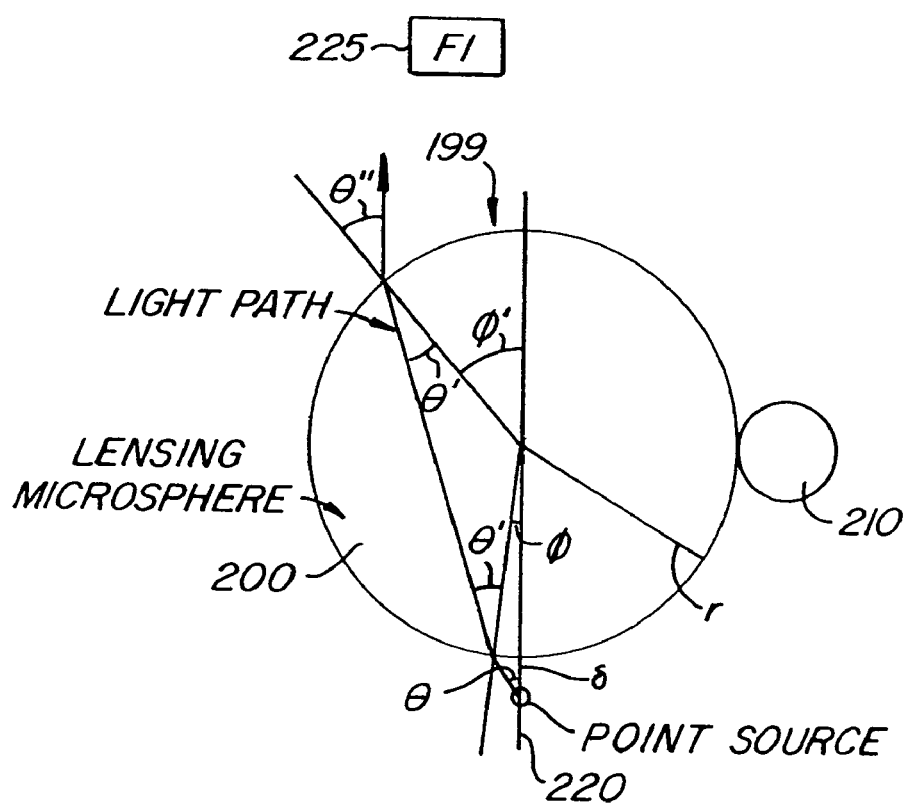
FIG. 2A shows optical ray tracing of dual microspheres.

A first embodiment is used to sense high frequency rotational motion. An asymmetric fluorescent probe is formed of a microsphere pair 199 as shown in FIG. 2A. The probe includes a first latex microsphere 200 in optical and physical contact with a second latex microsphere 210. The first microsphere 200 is approximately 1.1 μm in diameter and forms a lensing portion. The smaller microsphere 210, which can be between 0.5 μm and 1 μm, is fluorescently-labeled. The larger microsphere 200 acts as a lens that enhances the collection efficiency of the optical system.

The two microspheres are connected together. Light is passed by the optical combination of the two spheres. FIG. 2A shows optical ray tracing of the two microspheres. The ray originally starts at an angle θ relative to the vertical 220. After passing through the lensing microsphere 200, the ray continues at an angle $\phi'-\theta''$. If the lens is in water, the index of refraction of the water, $n_1$, is 1.3. The microsphere 200 has an index of refraction, $n_2$, =1.59 (for polystyrene). A photodetector 225 monitors for the proper fluorescence from the marked sphere 210.

When the microsphere pair 199 is oriented relative to the photodetector 225 as shown in FIG. 2A, light passes through the flourescently-marked microsphere 210 directly to the photodetector 225, and a relatively dim signal of the marked sphere 210 is obtained.

Figure 2B:
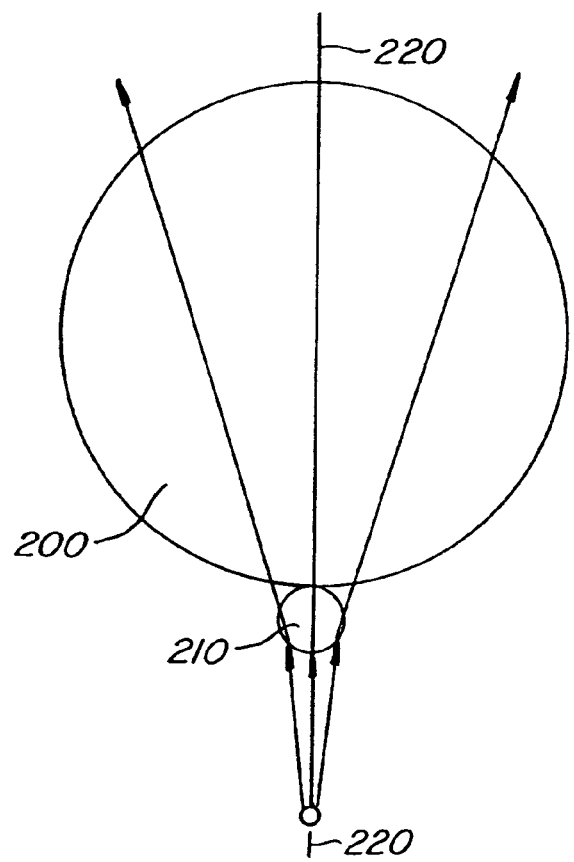
FIG. 2B shows the microspheres arranged in an enhanced signal mode.
Figure 2C:
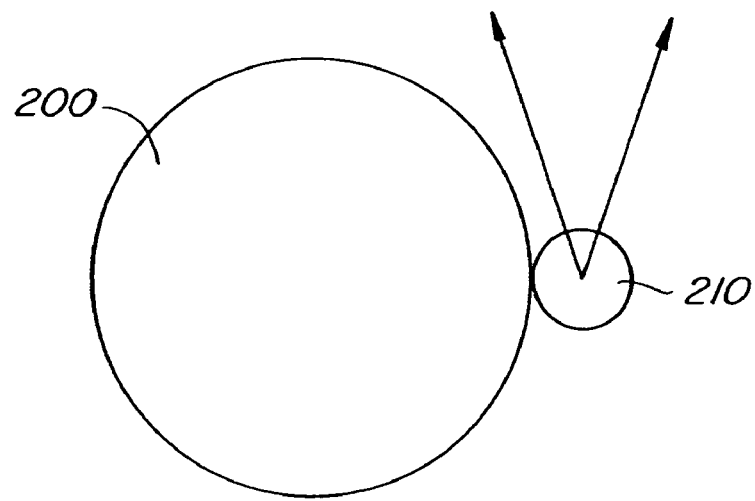
FIGS. 2C and 2D shows schematic views illustrating the magnitude of the signal received based upon orientation of the microspheres of FIGS. 2A and 2B, respectively.
Figure 2D:
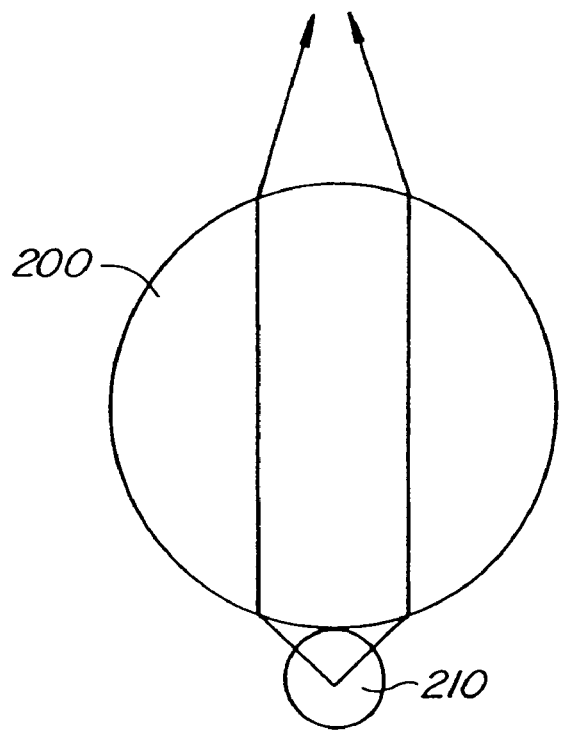

FIG. 2B shows the microsphere pair oriented in alignment with the optical collection axis 220. In this situation, the fluorescence from the marked microsphere, or objective 210 is enhanced by the lensing action of the lens 200. The amount of collected light indicative of the marked lens is enhanced. This can be seen according to a geometric optics argument, as indicated in FIGS. 2C and 2D, which show schematic views comparing the magnitude of the signal received based upon orientation of the microspheres of FIGS. 2A and 2B, respectively.

The angles of ray tracing are outlined in FIG. 2A The exit angle $\phi'-\theta''$ can be calculated as a function of the incident angle θ. The fluorescent microsphere 210 is approximated as a point particle located a distance δ from the lensing microsphere. Using geometry, it can be seen that $$\phi'=\pi-(\pi-2\theta'+\phi)=2\theta'-\phi$$

Applying Snell's law at the top interface of the lensing microsphere:

$$\theta'' = \sin^{-1}\left(\frac{n_2}{n_1}\sin\theta'\right)$$

where $n_2$ is the index of refraction of the lensing microsphere and $n_1$ is the index of refraction of the surrounding medium (typically water). Applying Snell's law at the bottom interface gives $$\theta' = \sin^{-1}\left(\frac{n_2}{n_1}\sin(\theta + \phi)\right)$$

Then, direct substitution of equation (3) into equation (2), shows that $$\theta'' = \phi + \theta$$

Using the law of sines, this can be rewritten as $$\frac{\sin(\pi - \theta - \phi)}{r + \delta} = \frac{\sin\theta}{r},$$

and then explicitly find the angle $\phi$ as a function of r, $\theta$, and $\delta$:

$$\phi(r, \theta, \delta) = \sin^{-1}\left(\frac{r+\delta}{r}\sin\theta\right) - \theta.$$

Finally, the exit angle $\phi'-\theta''$ can be written in terms of the original angle $\theta$, the radii of the two spheres, r, $\delta$, and the indices of refraction, $n_1$ and $n_2$.

$$\phi' - \theta''' = 2\sin^{-1}\left(\frac{n_1}{n_2}\sin(\theta + \phi(r, \theta, \delta))\right) - \theta - 2\phi(r, \theta, \delta).$$

For $\delta \ll t$, $\phi \ll \theta$. The exit angle is then given by $$\phi' - \theta'' = 2\sin^{-1}\left(\frac{n_1}{n_2}\sin\theta\right) - \theta.$$

Typical realizable values of $n_1$ and $n_2$ are for water, $n_1=1.3$ and polystyrene, $n_2=1.59$. For small $\theta$, the equation above reduces to $$\left(2\frac{n_1}{n_2} - 1\right)\theta.$$

This gives an exit angle of 0.64•$\theta$ for a ray entering at an angle $\theta$. Since the exit angle is always less than the original angle, the lensing microsphere focuses rays from the fluorescent microspheres and enhances the optical signal.

The enhancement in the observed optical signal also depends on the numerical aperture of the objective. The numerical aperture (NA) is defined as NA=n sin $\theta_0$, where $\theta_0$ is the collection angle. For the present objective (20×, 0.4 NA) in air $\theta_0=23.6°$. The equation shows that the focusing microsphere increases the angle of collection to 43.5°. This corresponds to an effective NA of 0.69. The epi-fluorescent intensity in proportional to $NA^4$, so the intensity enhancement should relate $(0.69/0.4)^4 \approx 9$ times.

Figure 3:
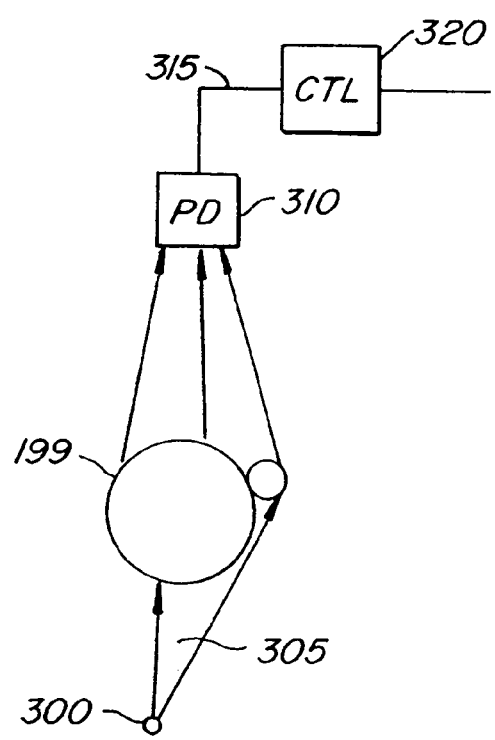
FIG. 3 shows a block diagram of the electronics used in the rotation detector.

FIG. 3 shows a block diagram of the electronics of the system. A light source 300 shines light along an optical axis 305. The microsphere pair 199 is located along this optical axis 305. Light which shines through the microsphere pair impinges on a photodetector 310 which produces a signal 315 indicative of the amount of incoming light. This signal 315 is coupled to a controller element 320 such as a processor. The processor measures the signal amplitude of the flourescently-marked portion of the light. From this amplitude, the processor calculates either an orientation angle of the pair 199, or more simply a signal indicative of the rate of change of that orientation angle.

The rate of change indicates the rate of rotation of the pair 199.

The above has described one embodiment of these miniature lenses, but other applications are also possible.

Figure 4:
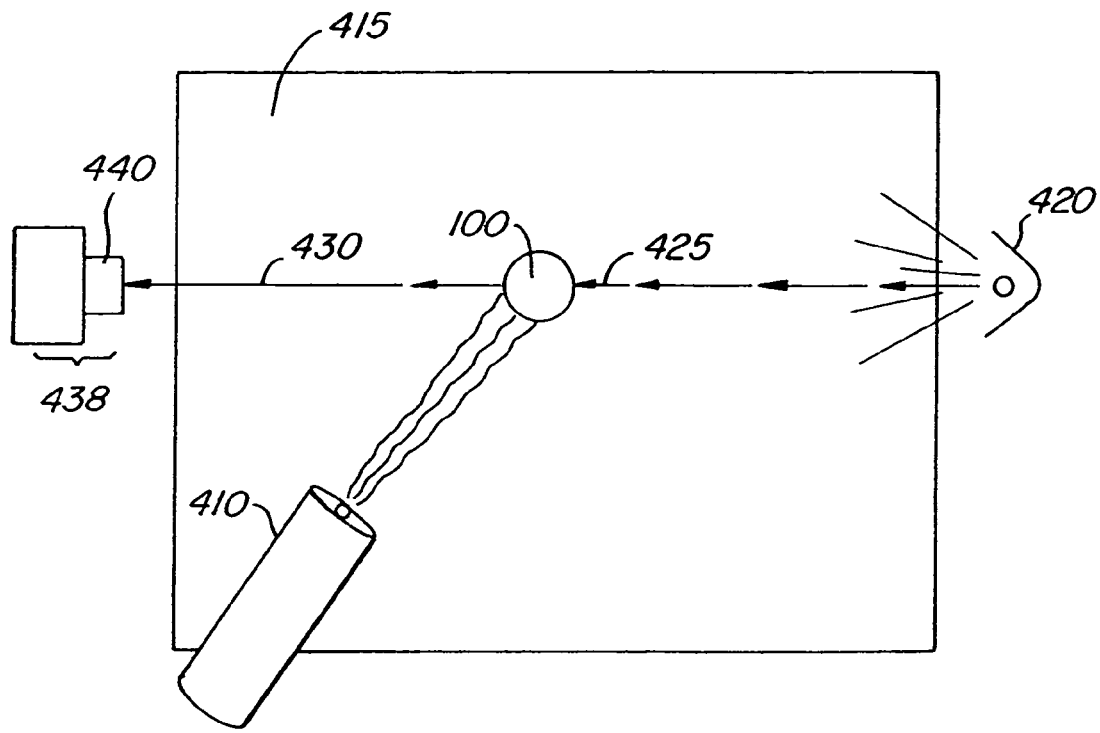
FIG. 4 shows an optical microscope formed with a microsphere lens.

FIG. 4 shows the microlensing particle used in an optical scanning microscope. The microsphere lens 100 is held within optical tweezers over a surface 415 to be scanned. The lens is indexed by an indexer 410 to scan the device across the surface 415. The surface can be illuminated by a lamp 420, causing light to reflect off the surface. Alternatively, the light from lamp 420 can cause fluorescence of the materials on the surface 415.

The light reflected from the surface, shown as 425, produces an output 430 which is collimated when the microsphere is directly above the surface area being imaged.

The microlens enhances the numerical aperture of the objective 440 of the microscope 438. This enables the microscope to have a high numerical aperture combined with a long working distance. Such a microscope avoids the usual trade off between light collecting capability (numerical aperture) and working distance.

In one mode, the microlens 100 can actually be smaller than the wavelength of light that is used. This allows the microscope to resolve at a resolution that is higher than the diffraction limit of the radiation.

Figure 5:
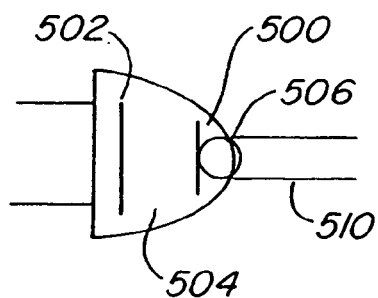
FIG. 5 shows a laser with a microsphere lens.

Another application of the microlens is shown in FIG. 5. Diode lasers are often small devices which produce a laser output over a very small scale. The laser output is often Gaussian.

A diode laser relies on two mirrors shown as 500 and 502 to form a lasing cavity 504. The present embodiment attaches microlens 506 directly on the output mirror 500. This helps collimate the laser beam 510. Moreover, since the laser itself is often on the order of size of 10 μm, a microscopic lens can help collimate almost all of the output light from the laser while minimally adding to the size of the laser.

Figure 6:
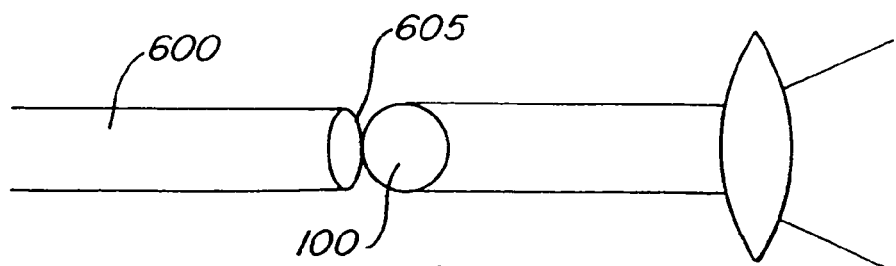
FIG. 6 shows a fiber with a microsphere lens.

FIG. 6 shows an optical fiber 600 using light collimated by a lens, to converge on the fiber end 605. In this embodiment, microsphere lens 100 is coupled directly onto the end of the fiber, and centered on the end of the fiber. The microsphere increases the effective numerical aperture and hence improves the coupling efficiency of the light.

In the embodiments of FIGS. 5 and 6, the lens can be attached to the desired surface, using a biochemical glue such as avidin or biotin, to hold the lens in place. Alternatively, the lens could be properly positioned with optical tweezers, and melted or welded into place.

Other modifications are contemplated.

What is claimed is:

1. An optical device comprising:
a spherical lensing element having a diameter of 10 μm or less, the spherical lensing element configured to collimate incident light to generate a collimated light beam; and
an optical imaging element receiving the collimated light beam, wherein:
   the incident light beam is emitted from a surface of an object that is to be imaged; and
   the lensing element is configured to receive the incident light generated by fluorescence of the object.

2. An optical device comprising:
a spherical lensing element having a diameter of 10 μm or less, the spherical lensing element configured to collimate incident light to generate a collimated light beam; and
an optical imaging element receiving the collimated light beam, wherein:
   the incident light is emitted from a surface of an object that is to be imaged; and
   the diameter of the optical imaging element is smaller than a wavelength of the incident light, thereby enabling a resolution greater than a diffraction limit of the incident light.

3. An optical device comprising:
a spherical lensing element having a diameter of 10 μm or less, the spherical lensing element configured to collimate the incident light to generate a collimate light beam; and
an optical imaging element receiving the collimated light beam, wherein:
   the incident light is emitted from a surface of an object that is to be imaged; and
   optical tweezers holding the lensing element over the surface.

4. A method of focusing light comprising collimating incident light with a spherical lensing element having a diameter of 10 μm or less, wherein:
   the incident light is emitted from a surface of an object that is to be imaged; and
   the incident light is generated by fluorescence of the object.

5. A method of focusing light comprising collimating incident light with a spherical lensing element having a diameter of 10 μm or less, wherein:
   the incident light is emitted from a surface of an object that is to be imaged; and the diameter of the optical imaging element is smaller than a wavelength of the incident light, thereby enabling a resolution greater than a diffraction limit of the incident light.

6. A method of focusing light comprising:
collimating incident light with a spherical lensing element having a diameter of 10 μm or less, wherein the incident light is emitted from a surface of an object that is to be imaged; and
holding the lensing element over the surface with optical tweezers.

* * * * *